US009253942B2

(12) United States Patent
Alliss et al.

(10) Patent No.: US 9,253,942 B2
(45) Date of Patent: Feb. 9, 2016

(54) TRIMMER HEAD WITH AUTOMATIC TRIMMER LINE FEED MECHANISM

(76) Inventors: George E. Alliss, Bladenboro, NC (US); Steven W. Hamblin, Daleville, VA (US)

(*) Notice: Subject to any disclaimer, the term of this patent is extended or adjusted under 35 U.S.C. 154(b) by 598 days.

(21) Appl. No.: 13/237,927

(22) Filed: Sep. 20, 2011

(65) Prior Publication Data
US 2012/0066913 A1 Mar. 22, 2012

Related U.S. Application Data

(60) Provisional application No. 61/384,438, filed on Sep. 20, 2010.

(51) Int. Cl.
*A01D 34/416* (2006.01)

(52) U.S. Cl.
CPC ........ *A01D 34/4162* (2013.01); *A01D 34/4165* (2013.01)

(58) Field of Classification Search
CPC ................ A01D 34/412–34/42; A01D 34/46; A01D 34/49; A01D 34/52–34/62
USPC .................... D8/8; 30/276–277.4; 56/12.7, 17
See application file for complete search history.

(56) References Cited

U.S. PATENT DOCUMENTS

| 4,285,127 | A | * | 8/1981 | Zerrer et al. ..................... 30/276 |
| 4,817,288 | A | * | 4/1989 | Hirose et al. .................... 30/276 |
| 4,866,846 | A | * | 9/1989 | Hoffmann et al. ............... 30/276 |
| 4,897,923 | A | * | 2/1990 | Collins ............................ 30/276 |
| 4,926,557 | A | * | 5/1990 | Haupt ............................. 30/276 |
| 4,959,904 | A | * | 10/1990 | Proulx ............................. 30/276 |
| 4,989,321 | A | * | 2/1991 | Hoffmann ........................ 30/276 |
| 5,010,649 | A | * | 4/1991 | Hoffmann ........................ 30/276 |
| 5,060,384 | A |   | 10/1991 | Everts |
| 5,095,688 | A | * | 3/1992 | Fabrizio .......................... 56/12.7 |
| 5,109,607 | A |   | 5/1992 | Everts |
| 5,339,526 | A | * | 8/1994 | Everts ............................. 30/276 |
| 5,749,148 | A | * | 5/1998 | White et al. .................... 30/276 |
| 5,806,192 | A | * | 9/1998 | Everts et al. .................... 30/276 |
| 5,809,655 | A | * | 9/1998 | Houben et al. .................. 30/276 |
| 5,881,464 | A |   | 3/1999 | Collins et al. |
| 6,854,185 | B1 | * | 2/2005 | Alliss ............................. 30/276 |
| 6,952,877 | B2 | * | 10/2005 | Pfaltzgraff ...................... 30/276 |
| 7,412,768 | B2 | * | 8/2008 | Alliss ............................. 30/276 |
| D597,804 | S | * | 8/2009 | Alliss ................................ D8/8 |

(Continued)

FOREIGN PATENT DOCUMENTS

WO  WO 2009067184 A2 * 5/2009
WO  WO 2015077393 A1 * 5/2015

*Primary Examiner* — Jason Daniel Prone
(74) *Attorney, Agent, or Firm* — Merek, Blackmon & Voorhees, LLC

(57) ABSTRACT

An automatic-feed trimmer head for a vegetation trimming machine. A spool is positioned within the interior of a housing. A cam guide formation is disposed atop the top flange of the spool. The cam guide formation defines a pathway. A cam arm is provided that is mounted to the housing with a pivot connection. The cam arm has a cam projection that extends into the pathway. A spring is provided that biases the cam arm into a first orientation. In the first orientation, the shape of the pathway enables the cam projection to move only in a first direction. The cam arm moves about the pivot connection from its first orientation to a second orientation when the trimmer head assembly is rotated above a predetermined rotational speed. When the cam arm is in its second orientation trimmer line is unwound from the spool.

9 Claims, 7 Drawing Sheets

(56) References Cited

U.S. PATENT DOCUMENTS

| | | | | |
|---|---|---|---|---|
| D598,254 S | * | 8/2009 | Alliss | D8/8 |
| D598,255 S | * | 8/2009 | Alliss | D8/8 |
| D630,068 S | * | 1/2011 | Proulx | D8/8 |
| D638,678 S | * | 5/2011 | Proulx | D8/8 |
| D638,679 S | * | 5/2011 | Proulx | D8/8 |
| 7,966,736 B2 | * | 6/2011 | Arnetoli | 30/276 |
| 7,984,555 B2 | * | 7/2011 | Arnetoli | 30/276 |
| 8,025,249 B2 | * | 9/2011 | Alliss | A01D 34/4165 30/276 |
| 8,567,073 B2 | * | 10/2013 | Proulx | 30/276 |
| 8,745,879 B2 | * | 6/2014 | Alliss | A01D 34/4162 30/276 |
| 8,910,387 B2 | * | 12/2014 | Alliss | A01D 34/4162 30/276 |
| 2008/0271424 A1 | * | 11/2008 | Alliss | A01D 34/4166 56/12.7 |
| 2011/0302793 A1 | * | 12/2011 | Alliss | A01D 34/4166 30/347 |
| 2015/0150191 A1 | * | 6/2015 | Alliss | A01D 34/4163 30/276 |

* cited by examiner

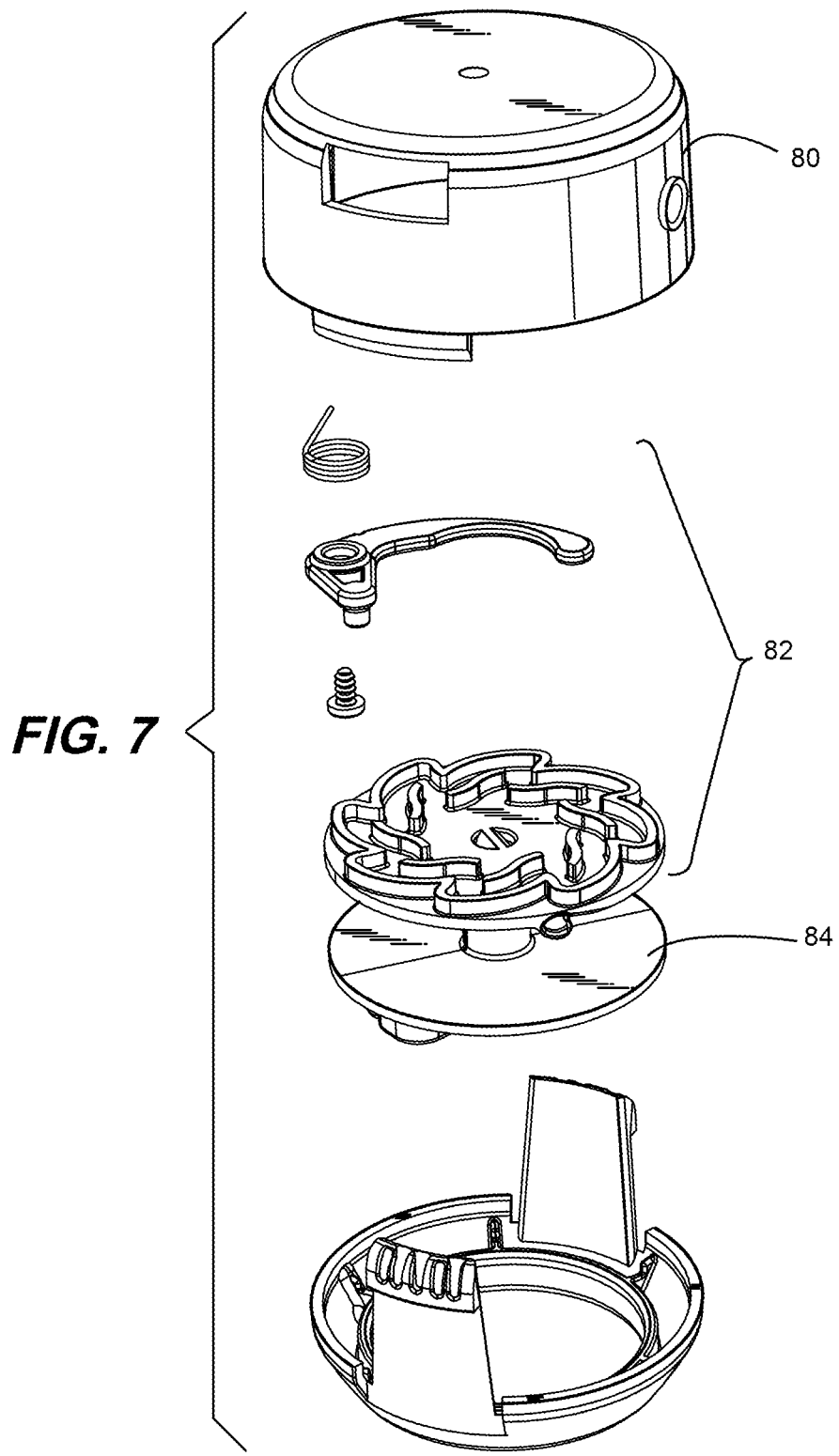

TRIMMER HEAD WITH AUTOMATIC TRIMMER LINE FEED MECHANISM

RELATED APPLICATIONS

The present invention is a continuation-in-part of U.S. Provisional Patent Application No. 61/384,438, entitled, Trimmer Head With Automatic Trimmer Line Mechanism and filed Sep. 20, 2010.

BACKGROUND OF THE INVENTION

1. Field of the Invention

The present invention relates to rotating string trimmers of the type used by homeowners and landscapers to cut growing vegetation. More particularly, the present invention relates to trimmer heads that automatically dispense additional trimmer line as the exposed trimmer line wears away.

2. Prior Art Description

String trimmer machines have been commercially sold for many decades. In this period of time, there have been many variations to the design of the string trimmer machine and especially to the trimmer head.

The trimmer head is the part of the string trimmer machine that rotates. The trimmer head holds lengths of trimmer line that rotate with the trimmer head. The rotating trimmer line contacts and cuts vegetation as it spins.

Depending upon the make, model, and manufacturer of the string trimmer machine, the trimmer head rotates either clockwise or counterclockwise during operation. The mix in the current retail market is evenly split between clockwise and counterclockwise rotating string trimmer machines.

There are many types of trimmer heads on the market. The most common types of trimmer heads are the bump-feed trimmer head and the automatic-feed trimmer head. Both types of trimmer heads contain an internal spool that holds a reserve of wound trimmer line. As the trimmer line wears away, it can be replaced from the internal spool. In a bump-feed trimmer head, a short length of line is released from the spool when the bottom of the trimmer head is impacted or "bumped" against a hard surface. In an automatic-feed trimmer head, a short length of line is released from the spool when a predetermined change in centrifugal forces occurs that indicates that the existing trimmer line has become too short. Many mechanisms exist in the prior art for controlling the release of wound trimmer line from the internal spool of a trimmer head. Bump-activated trimmer heads are exemplified by U.S. Pat. No. 5,881,464 to Collins, entitled Line Head For Flexible Line Trimmer. Automatic-feed trimmer heads are exemplified by U.S. Pat. No. 5,060,384 to Everts, entitled Automatic Head For A Line Trimmer; and U.S. Pat. No. 5,109,607 to Everts, entitled Automatic Line Trimmer Head.

Many problems exist with traditional trimmer head designs. Primary among those problems are problems concerning the twisting of string on the spool. Most trimmer heads contain two separate lengths of trimmer line. A trimmer head relies upon centrifugal force to pull the trimmer lines from the spool. If the trimmer lines tangle, twist, or become buried under subsequent windings, the trimmer lines will not dispense in the proper manner. The trimmer head must then be disassembled, the trimmer string unwound and again rewound in the proper manner before the trimmer head will again work as designed. Furthermore, whenever the trimmer string supply is exhausted, the trimmer head must be manually disassembled. The spool is removed and rewound with a new supply of trimmer line. The spool is then reassembled back into the trimmer head. This process is difficult, labor intensive and highly time consuming. Furthermore, the entire process is often too difficult for many homeowners to complete successfully or even attempt. This is especially true with automatic feed trimmer heads that contain complex internal string release mechanisms that are contained within the trimmer head.

Another problem associated with traditional feed trimmer heads is the complexity and reliability of the release mechanism that draws trimmer line from the spool when needed. As many homeowners will attest, the mechanism for releasing the trimmer line is usually the first part of a string trimmer machine that fails to work. Once the release mechanism fails, the trimmer line must be periodically pulled out of the trimmer head using the operator's hands. This is both a time consuming and dangerous operation.

Yet another disadvantage of traditional trimmer heads is that most bump-activated trimmer heads and all known automatic-feed trimmer heads are designed to rotate in only a single direction. Accordingly, a trimmer head designed for a clockwise trimmer will not work on a counterclockwise trimmer. Furthermore, the parts from a clockwise trimmer head cannot be interchanged with any of the parts from a counterclockwise trimmer head. This requires a trimmer head manufacturer to create two sets of manufacturing tools, one for clockwise trimmer heads and one for counterclockwise trimmer heads. This significantly increases the cost associated with manufacturing trimmer heads. Furthermore, it results in each trimmer head design having two different models, one for clockwise rotation, and one for counterclockwise rotation. This significantly increases the chances that a consumer will purchase the wrong type of trimmer head for his/her string trimmer machine when looking for a replacement.

A need therefore exists for an automatic-feed string trimmer head that has an inexpensive yet reliable mechanism for dispensing trimmer line when needed. A need also exists for an automatic-feed string trimmer head that dispenses trimmer line without the trimmer line tangling, twisting, or binding. Furthermore, a need exists for an automatic-feed trimmer head that does not have to be disassembled to have new string added. Lastly, a need exists for an automatic-feed trimmer head that can be manufactured inexpensively and in a manner where many of the parts from a clockwise trimmer head are identical to parts in a counterclockwise trimmer head. These needs are met by the present invention as described and claimed below.

SUMMARY OF THE INVENTION

The present invention is an automatic-feed trimmer head for a vegetation trimming machine. The trimmer head assembly has a housing that rotates when the vegetation trimming machine is in operation. The housing has a base and a peripheral wall that extends from the base. The housing defines an interior.

A spool is provided that is positioned within the interior of the housing. The spool has at least a top flange and a bottom flange. A cam guide formation is disposed atop the top flange of the spool. A cam guide formation can also be disposed on the bottom flange if the spool is invertible for use on both vegetation trimming machines that rotate the trimmer head in a clockwise direction or vegetation trimming machines that rotate the trimmer head in a counterclockwise direction. The cam guide formation defines a pathway of a complex shape.

A cam arm is provided that is mounted to the housing with a pivot connection. The cam arm has a cam projection extending therefrom that extends into the pathway of the cam guide formation. A spring is provided that biases the cam arm about the pivot connection and into a first orientation. In the first orientation, the complex shape of the pathway enables the cam projection to move only in a first direction along the pathway. As such, the spool can only rotates relative the housing in one direction.

However, the cam arm moves about the pivot connection from its first orientation to a second orientation when the trimmer head assembly is rotated above a predetermined rotational speed. When the cam arm is in its second orientation, the complex shape of the pathway enables the cam projection to move only in a second direction along the pathway. This enables the spool to rotate relative the housing in the opposite second direction.

When the spool rotates in the second direction, trimmer line is unwound from the spool. As trimmer line is unwound from the spool, the rotational speed of the trimmer head assembly slows. When the trimmer line is at a desired length, the cam arm rocks back to its first orientation and prevents any further trimmer line from unwinding. The result is an automatic-feed trimmer head assembly that automatically dispenses trimmer line whenever the trimmer line wears too short and the rotational speed of the trimmer head assembly surpasses a corresponding threshold speed.

BRIEF DESCRIPTION OF THE DRAWINGS

For a better understanding of the present invention, reference is made to the following description of exemplary embodiments thereof, considered in conjunction with the accompanying drawings, in which:

FIG. 7 is an exploded view of an alternate embodiment of a trimmer head assembly.

DETAILED DESCRIPTION OF THE DRAWINGS

Although the present invention automatic-feed trimmer head can be embodied in many ways, only a few exemplary embodiments are illustrated. These embodiments are selected in order to set forth two of the best modes contemplated for the invention. The illustrated embodiments, however, are merely exemplary and should not be considered a limitation when interpreting the scope of the appended claims.

Figure 1:
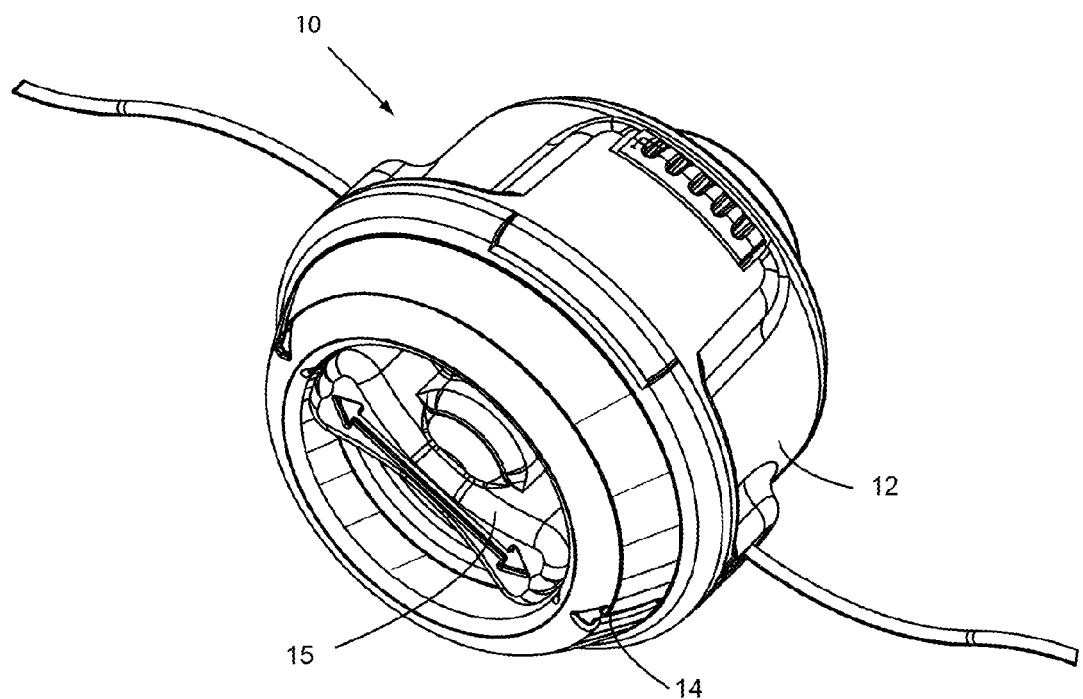
FIG. 1 is a perspective view of an exemplary embodiment of a trimmer head assembly.
Figure 2:
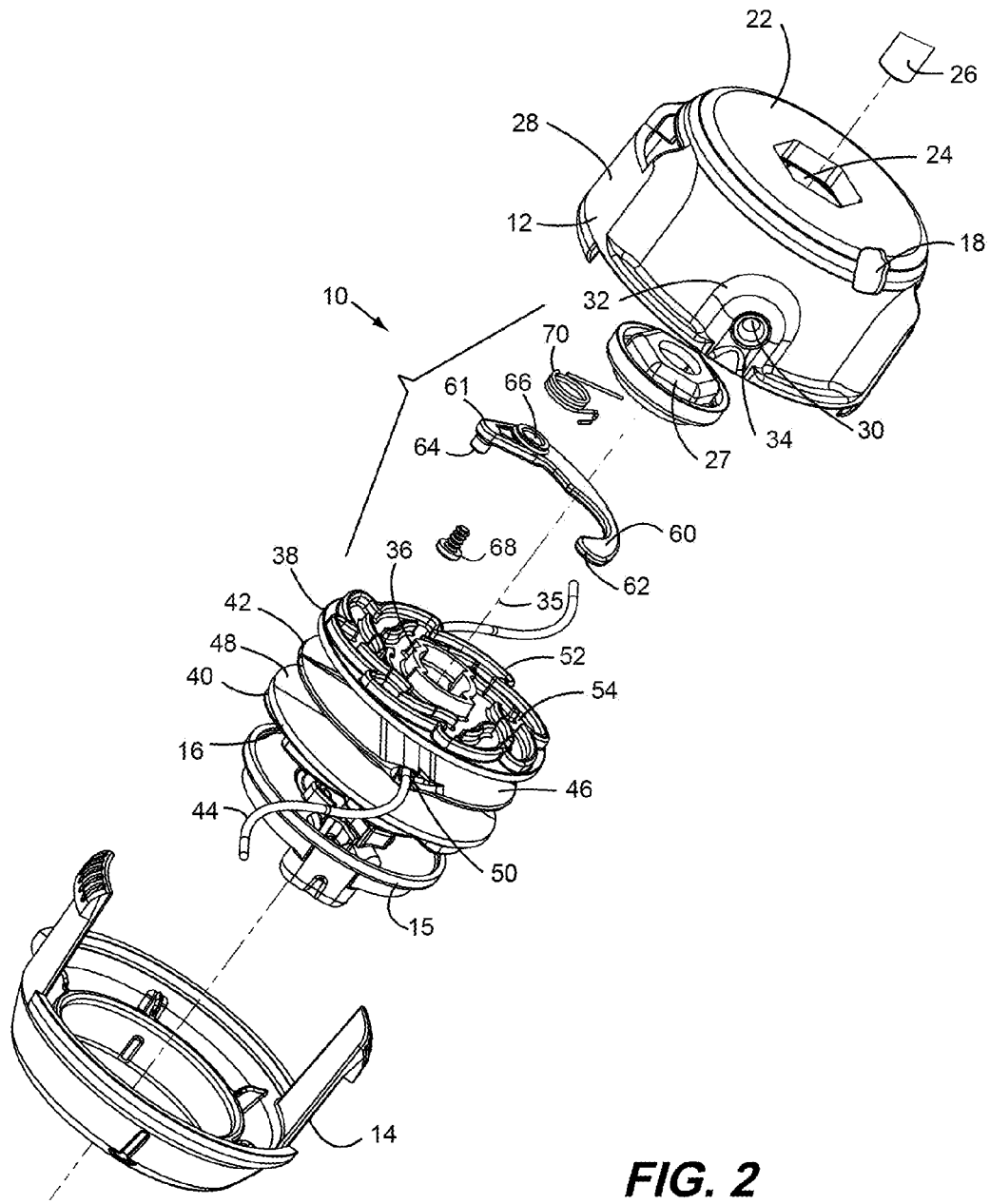
FIG. 2 is an exploded perspective view of the embodiment of FIG. 1.

Referring to FIG. 1 in conjunction with FIG. 2, an exemplary embodiment of a trimmer head assembly 10 is shown. The major components of the trimmer head assembly 10 include a housing 12, a cap 14, a turn dial 15, a spool 16, and an automatic-feed mechanism 20. The automatic-feed mechanism 20 interacts between the housing 12 and the spool 16 to permit the spool 16 to rotate relative the housing 12 and automatically dispense trimmer line 44 when needed. As will be later explained in detail, the automatic-feed mechanism 20 enables the spool 16 to automatically dispense trimmer line 44 whenever the amount of trimmer line 22 extending out of the housing 12 wears below a certain length.

The housing 12 defines an open interior 18 large enough to receive the spool 16 and the components of the automatic-feed mechanism 20. The housing 12 has a base 22. A mounting hole 24 is provided in the center of the base 22. A drive shaft 26 of a vegetation trimming machine passes through the mounting hole 24. The drive shaft 26 is engaged by a mounting nut 27. In this manner, the housing 12 becomes physically interconnected with the drive shaft 26 and spins with the drive shaft 26 when the vegetation cutting machine is in operation.

A cylindrical wall 28 extends below the base 22 of the housing 12 to form the sides of the housing 12. At least two string ports 30 are formed through the cylindrical wall 28. The string ports 30 are diametrically opposed. If more than two string ports are provided, it will be understood that the various string ports will be symmetrically disposed. The housing 12 may contain thickened regions 32 about each of the string ports 30 to compensate for the wearing of plastic at the string ports 30. Furthermore, optional eyelets 34 may be provided within the string ports 20. The eyelets 34 can be made from metal, ceramic, or a hard plastic that resists contact wear better than does the material of the remainder of the housing 12.

A complex spool 16 is provided that is sized to fit within the open interior 18 of the housing 12. The spool 16 rotates about an imaginary axis of rotation 35. The spool 16 has a cylindrical hub 36 that supports a top flange 38, a bottom flange 40, and a central flange 42. Accordingly, the spool 16 contains two separate winding chambers 46, 48 where lengths of trimmer line 44 can wind around the cylindrical hub 36. An upper winding chamber 46 is disposed between the top flange 38 and the central flange 42. A lower winding chamber 48 is disposed between the central flange 42 and the bottom flange 40.

Two line-feed conduits 50 extend into the central flange 42. The one line-feed conduit 50 shown in FIG. 2, has a side relief that leads into the lower winding chamber 48. The opposite line-feed conduit, not shown, has a side relief that leads into the upper winding chamber 46. The line-feed conduits 50 are used to receive and engage the ends of two lengths of trimmer line 44. In this manner, when the spool 16 is rotated, the trimmer line 44 will either separately wind onto, or unwind from, the upper and lower winding chambers 46, 48, respectively. Alternatively a single length of trimmer line 44 may pass through the spool 16 and both line feed conduits 50. Likewise, when the spool 16 is rotated, the trimmer line 44 will either separately wind onto, or unwind from, the upper and lower winding chambers 46, 48, respectively.

The automatic feeding mechanism 20 includes a cam guide formation 52 formed on the top flange 38 of the spool 16. The mirror image of the same cam guide formation 52 can also be formed on the bottom flange 40 of the spool 16. In this manner, the spool 16 can be selectively inverted. This enables the trimmer head assembly 10 to be changed back and forth between a trimmer head for a clockwise spinning trimmer machine and a counterclockwise spinning trimmer machine.

Figure 3:
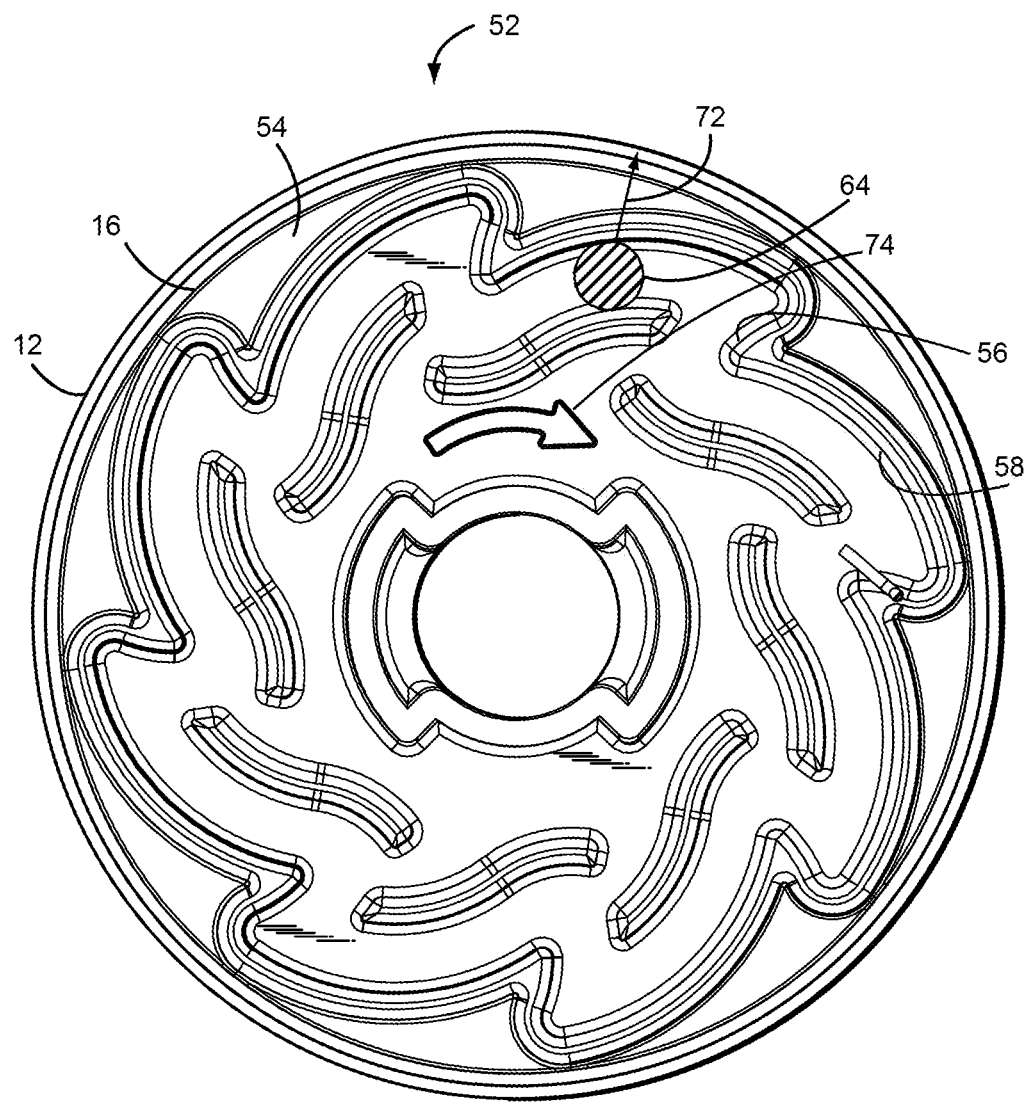
FIG. 3 is a cross-sectional view of the exemplary embodiment showing the cam arm in its first orientation.

Referring to FIG. 3 in conjunction with FIG. 2, it can be seen that the cam guide formation 52 defines a continuous pathway 54. Symmetrically disposed along the pathway 54 are a series of catch ledges 56. In between the various catch ledges 56 are sloped surfaces 58. The catch ledges 56 and the sloped surfaces 58 defines the outer most wall of the pathway 54.

A cam arm 60 is provided. The cam arm 60 has two ends 61, 62. A cam projection 64 extending downwardly at the first end 61 of the cam arm 60. An eccentric pivot hole 66 is formed through the cam arm 60 at a point closer to the first end 61 of the cam arm 60 than the second end 62. The cam projection 64 rides within the pathway 54 defined by the cam guide formation 52. The cam projection 64 has a diameter that is slightly smaller than the width of the pathway 54.

The cam arm 60 is pivotably connected to the housing 12 about a pivot screw 68. The pivot screw 68 passes through the pivot hole 66. As such, the cam arm 60 is free to rock about the pivot screw 68. The cam arm 60 rocks in a plane that is perpendicular to the axis 35 of the spool 16. However, the cam arm 60 is not loose. A torsion spring 70 is provided that biases the cam arm 60 clockwise about the pivot screw 68, when viewed from above. As such, it will be understood that the torsion spring 70 causes the cam projection 64 to be biased toward the outside of the cam guide formation 52, in the direction of arrow 72. It will therefore be further understood that as the spool 16 is rotated in the direction of arrow 74 relative the housing 12, the cam projection 64 will freely move along the pathway 54, riding successively up each of the sloped surfaces 58 it encounters. The cam projection 64, therefore, does not prevent the spool 16 from rotating relative the housing 12 in the direction of arrow 74. This enables a user to wind trimmer line 44 around the spool 16 by manually turning the spool 16.

Figure 4:
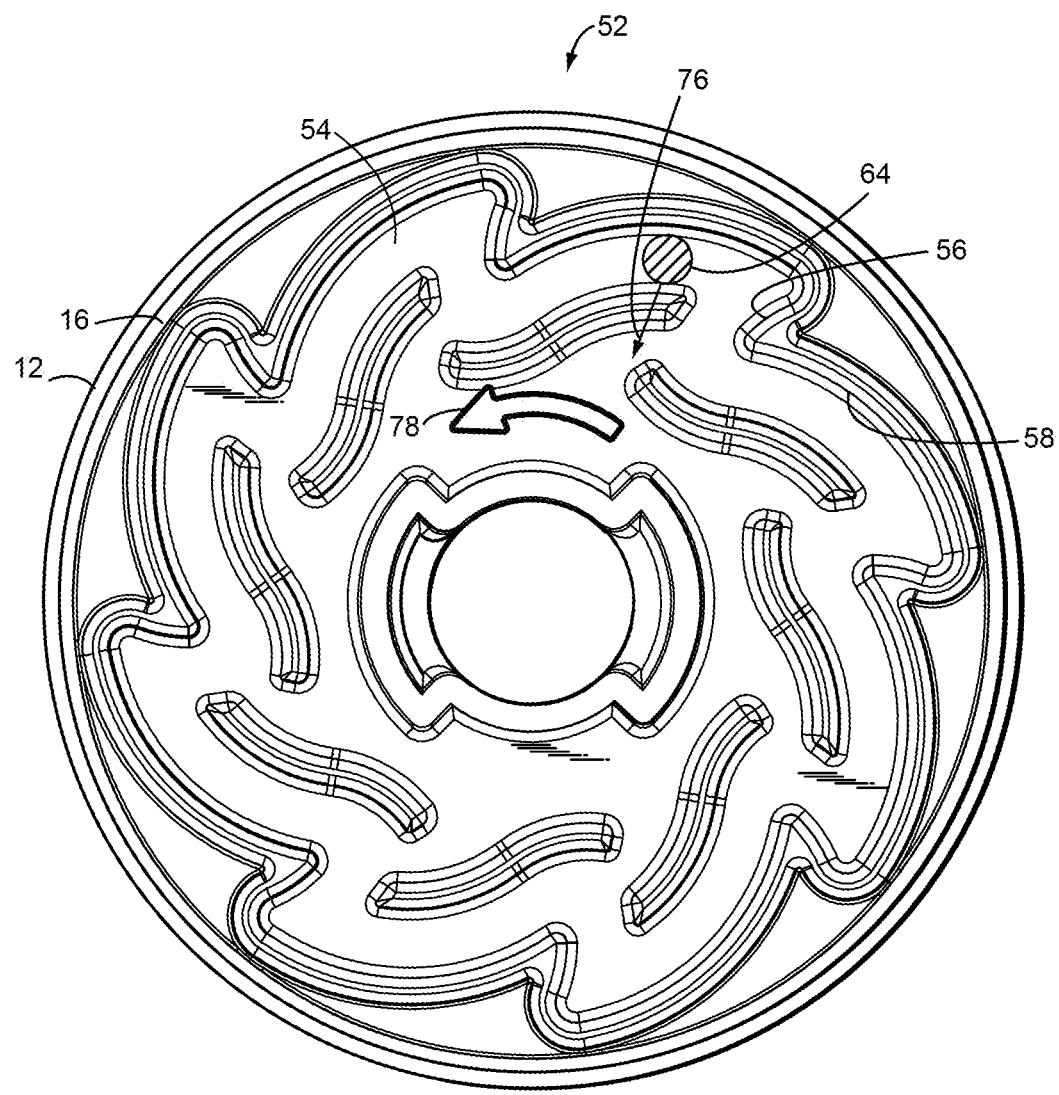
FIG. 4 is a cross-sectional view of the exemplary embodiment showing the cam arm in its second orientation.

The center of gravity of the cam arm 60 is between the pivot hole 66 and the second end 62. This places the center of gravity closer to its second end 62 than to its first end 61. Referring to FIG. 4 in conjunction with FIG. 2, it will be understood that as the trimmer head assembly 10 spins, centrifugal force causes the cam arm 60 to pivot in a counter-clockwise direction in direct opposition to the bias force supplied by the torsion spring 70. As the trimmer head assembly 10 reaches a certain rotational speed, the centrifugal force surpasses the spring bias and the cam projection 64 is biased inwardly in the direction of arrow 76. This enables the cam projection 64 to move counter-clockwise in the pathway 54 of the cam guide formation 52 in the direction of arrow 78.

When the trimmer machine is not in operation, no appreciable centrifugal forces affect the trimmer head assembly 10. Consequently, the spool 16 is free to be manually rotated within the housing 12 in the counter-clockwise direction depicted in FIG. 3. This enables a user to easily wind new trimmer line 44 onto the spool 16. Referring to FIGS. 1, 2 and 3 it will be understood that in order to wind new trimmer line 44 into the trimmer head assembly 10, either one or two lengths of trimmer line 44 are provided. The spool 16 is manually rotated until the line-feed conduits 50 on the central flange 42 align with the string ports 30 in the housing 12. If one length of trimmer line 44 is provided, the trimmer line 44 is inserted into one string port 30, through the central flange 42 of the spool 16 and out the opposite port. The trimmer line 44 is pulled through the trimmer head assembly 10 until roughly equal lengths of trimmer line 44 are present on either side of the trimmer head assembly 10. The spool 16 is then rotated by grasping and turning the turn dial 15 at the bottom of the spool 16. As the spool 16 rotates, the spool 16 winds half of the trimmer line 44 in the upper winding chamber 46 and the other half of the trimmer line 44 in the lower winding chamber 48. By winding the trimmer line 44 into separate winding chambers 46, 48, all problems associated with line twisting and entanglement are removed.

If two separate lengths of trimmer line 44 are provided, then each length of trimmer line 44 is inserted into a different line-feed conduit 50 and into opposite sides of the central flange 42 of the spool 16. The spool 16 is then rotated by grasping and turning the turn dial 15, which turns the spool 16. As the spool 16 rotates, the spool 16 winds one length of trimmer line 44 into the upper winding chamber 46 and the other length of trimmer line 44 into the lower winding chamber 48. By winding the trimmer lines 44 into separate winding chambers 46, 48 all problems associated with line twisting and entanglement are removed.

The terms trimmer line, string line, string and line are usable interchangeably and refer to trimmer line 44 that can optionally be would on the spool of the trimmer head as shown in FIG. 1, unless explicitly stated elsewhere.

Using either one length of line 44 or two lengths of line 44, it can be seen that the trimmer line 44 can be quickly wound onto the spool 16 without any disassembly of the trimmer head assembly 10. New trimmer line 44 can therefore be added without tools in a simple and easy to understand procedure.

In operation, the trimmer head assembly 10 rotates at high speeds. The speed of rotation, however, is highly dependent upon the length of the trimmer lines 44 that extend from the trimmer head assembly 10. Due to the law of conservation of angular momentum, the trimmer head assembly 10 will spin slowest when the trimmer lines 44 are at their longest and will increase in rotational speed as the trimmer lines 44 shorten.

The cam arm 60 is designed so that the bias of the torsion spring 70 rotating the cam arm 60 clockwise is dominant provided the trimmer machine is rotating at operational speeds and the length of the trimmer lines 44 are over 75% of their ideal length. However, if the length of the trimmer lines 44 wears below 75% of the ideal length, then the rotational speed of the cam arm 60 becomes sufficient enough to create a centrifugal force that is greater than that of the spring bias. The cam projection 64 on the cam arm 60 then moves in the opposite direction, as is illustrated in FIG. 4. This enables the spool to unwind in the housing 12 and release more trimmer line 44. As soon as the trimmer line 44 is released, the rotational speed of the trimmer head assembly 10 slows and the bias provided by the torsion spring 70 becomes predominant on the cam arm 60. The cam projection 64 then returns to the condition illustrated in FIG. 3 and no further trimmer line 44 is released.

Figure 5:
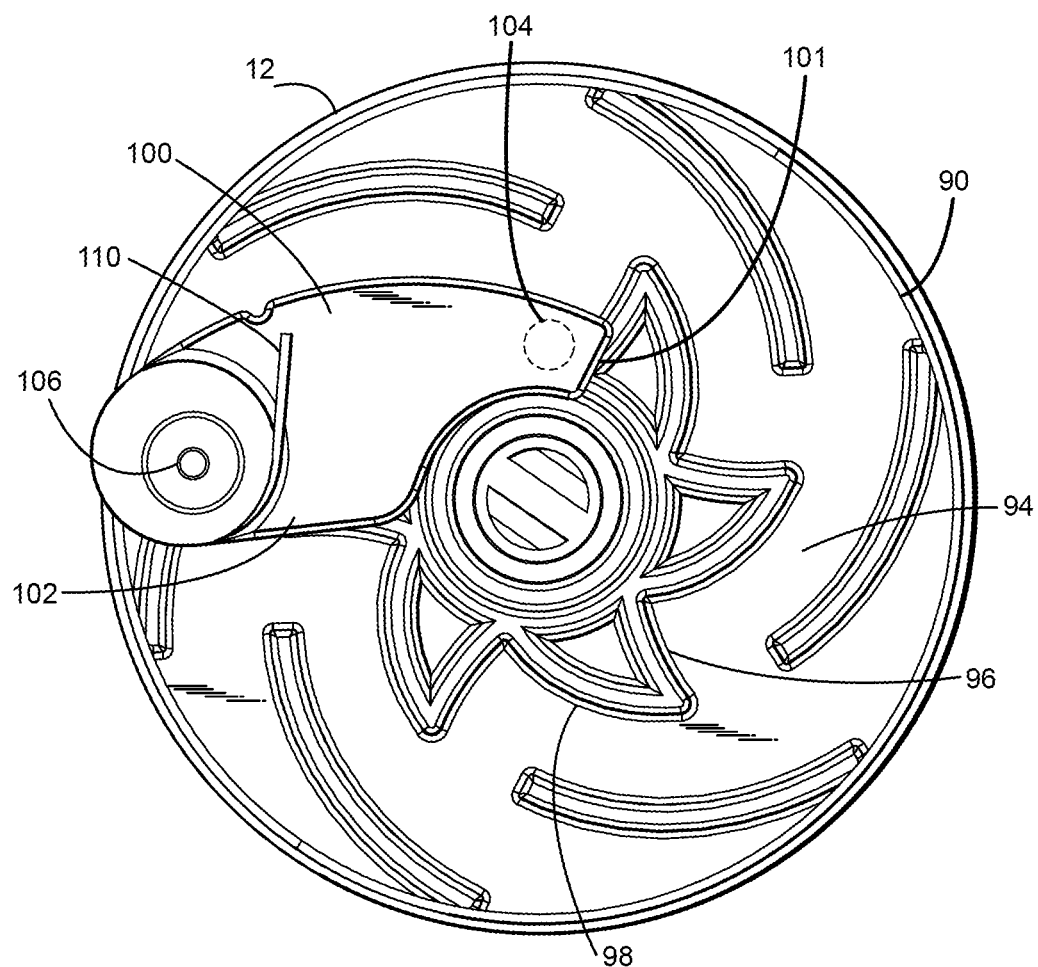
FIG. 5 is a cross-sectional view showing an alternate embodiment of a cam guide formation and cam arm.
Figure 6:
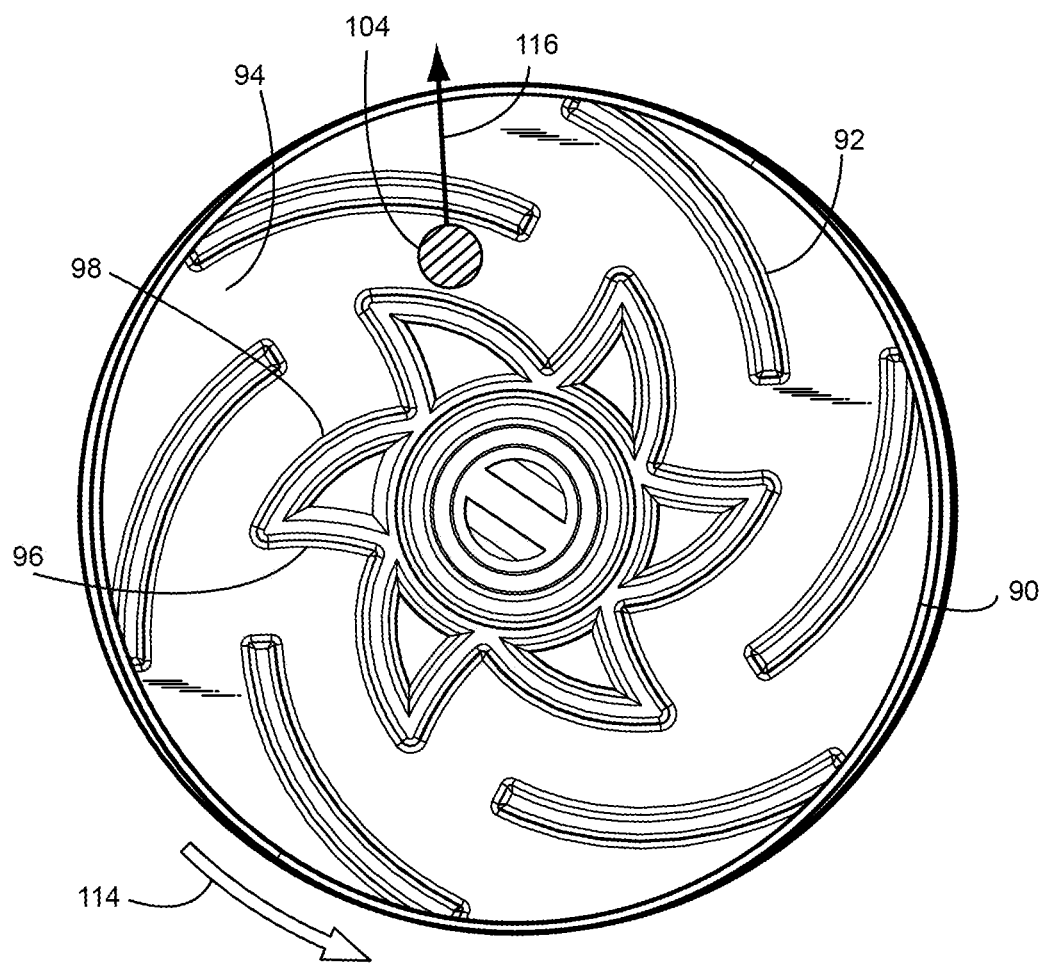
FIG. 6 is the same view as FIG. 5 with the cam arm removed so that the position of the cam projection can be visualized.

Referring to FIG. 5 and FIG. 6, an alternate embodiment of the cam guide formation and cam arm are shown. In the previous embodiment, the catch ledges were in the exterior of the pathway. In this alternate embodiment, the catch ledges are provided on the interior of the pathway.

As shown in FIG. 5 and FIG. 6, the cam guide formation 92 defines a continuous pathway 94. Symmetrically disposed along the interior of the pathway 94 are a series of catch ledges 96. In between the various catch ledges 96 are sloped surfaces 98. The catch ledges 96 and the sloped surfaces 98 defines the inside most wall of the pathway 94.

A cam arm 100 is provided. The cam arm 100 has two ends 101, 102. A cam projection 104 extends downwardly at the first end 101 of the cam arm 100. A pivot mount 106 is formed through the cam arm 100 at the second end 102. The cam projection 104 rides within the pathway 94 defined by the cam guide formation 92. The cam projection 104 has a diameter that is slightly smaller than the width of the pathway 94.

The cam arm 100 is pivotably connected to the housing. As such, the cam arm 100 is free to rotate at the pivot mount 106. The cam arm 100 rotates in a plane that is perpendicular to the axis of the underlying spool 90. A torsion spring 110 is provided that biases the cam arm 100 clockwise about the pivot mount 106, when viewed from above. As such, it will be understood that the torsion spring 110 causes the cam projection 104 to be biased toward the inside of the cam guide formation 92. It will therefore be further understood that as the spool 90 is rotated in the direction of arrow 114 relative the housing 12, the cam projection 104 will freely move along the pathway 94, riding successively up each of the sloped surfaces 98 it encounters. The cam projection 104, therefore, does not prevent the spool from rotating relative the housing 12 in the direction of arrow 114. This enables a user to wind trimmer line around the spool 90 by manually turning the spool 16.

The center of gravity of the cam arm 100 is between the pivot mount 106 and its free end 62. It will be understood that as the trimmer head assembly spins, centrifugal force causes the cam arm 100 to pivot in a counter-clockwise direction in direct opposition to the bias force supplied by the torsion spring 100. As the trimmer head assembly reaches a certain rotational speed, the centrifugal force surpasses the spring bias and the cam projection 104 is biased outwardly in the direction of arrow 116. This enables the cam projection 104 to move counter-clockwise in the pathway 94 of the cam guide formation 92.

When the trimmer machine is not in operation, no appreciable centrifugal forces affect the trimmer head assembly. Consequently, the spool 90 is free to be manually rotated within the housing 12 in the clockwise direction. This enables a user to easily wind new trimmer line onto the spool 90.

In the embodiments of FIGS. 1-6 a trimmer head assembly for a gasoline powered trimmer is shown. Gasoline powered trimmers rotate the trimmer head assembly either in a clockwise or counterclockwise direction depending upon the make and model of the trimmer machine. In the embodiments of FIGS. 1-6, the spool can be selectively inverted depending upon whether the trimmer head assembly will spin clockwise or counterclockwise. It will therefore be understood that the features of the cam guide formation can be molded on both sides of the spool, therein enabling the spool 16 to be selectively inverted as needed.

Referring to FIG. 7, an alternate embodiment of a trimmer head assembly 80 is shown. In this embodiment, the trimmer head assembly 80 is designed for use on an electric trimmer and therefore is designed only to rotate in a single direction. Accordingly, the features of the automatic-feed mechanism 82 are molded only on one side of the spool 84. Otherwise, the trimmer head assembly 80 operates in the same manner as the embodiments previously described.

It will be understood that the embodiments of the trimmer head assembly that have been illustrated are merely exemplary and that an expert in the field can make many variations and alternate embodiments of the invention. All such variations and alternate embodiments are intended to be included within the scope of the present invention.

What is claimed is:

1. A trimmer head assembly, comprising:
   a housing having a base and a peripheral wall that extends from said base, wherein said housing defines an interior, and wherein string line openings are disposed in said peripheral wall;
   a spool positioned within said interior of said housing, said spool having a top flange and a bottom flange;
   a cam guide formation disposed atop said top flange of said spool, wherein said cam guide formation has pathway walls defining a pathway;
   a cam arm mounted to said housing at a pivot connection, said cam arm having a cam projection extending therefrom that extends into said pathway of said cam guide formation; and
   a spring for biasing said cam arm about said pivot connection and into a first orientation,
   pathway walls include a plurality of ramps, each of said ramps extends from a first ramp end to a radially outward second ramp and said ramp,
   wherein when said trimmer head housing is rotated in a first direction relative to said cam arm
   pivot connection, said cam projection follows along a first of said plurality of ramps from said ramp first end to said second ramp end causing said spring to compress and further rotation causes said cam projection to move from said first of said plurality of ramps to a second of said plurality of ramps; and
   wherein when said trimmer head housing is rotated opposite said first direction relative to said cam arm pivot connection, said cam projection follows along a first of said plurality of ramps from said ramp second end to said first ramp end causing said spring to expand and further rotation causes said cam projection to rest between at said first of said plurality of ramps and a second end of a second of said plurality of ramps, whereby the spring bias of said spring on said cam projection prevents said cam projection from rotating further in said direction opposite said first direction relative to said first of said plurality of ramps; and
   further including a second cam guide formation disposed on said bottom flange of said spool.

2. The assembly according to claim 1, further comprising a string and wherein the spring force of said spring is selected such when said trimmer head is rotated by a predetermined constant torque, drag caused by said string extending radially outward from one of said housing string line openings above a predetermined length prevents said trimmer head assembly from reaching said predetermined rotational speed sufficient to allow said cam projection to compress said spring to allow said cam projection to pass radially past from said first ramp past said second ramp; and when said string is less than said predetermined length radially outward from said housing, reduced drag from the string allows said predetermined constant torque on said trimmer head assembly to reach said predetermined rotational speed sufficient to allow said cam projection to compress said spring and allow said can projection to move radially outward past said second end of said second ramp.

3. The assembly according to claim 1 wherein said first cam guide formation and said second cam guide formation are shaped as mirror images of each other.

4. The assembly according to claim 1, wherein said cam arm has a first end, a second end and a pivot hole, wherein said pivot connection extends through said pivot hole.

5. The assembly according to claim 4, wherein said cam arm has a center of gravity located between said pivot hole and said second end.

6. The assembly according to claim 1, wherein said spool has a central flange disposed between said top flange and said bottom flange, wherein a first winding chamber is defined between said top flange and said central flange for receiving a portion of a string line thereon, and a second winding chamber is defined between said central flange and said bottom flange for receiving a portion of a string line thereon.

7. The assembly according to claim 6, wherein said spool includes line-feed conduits disposed in said central flange that can be aligned with said string line openings in said housing.

8. The assembly according to claim 7, further including string line that is wound on said spool and extends through said line-feed conduits, out of said string line openings and away from said housing.

9. The assembly according to claim 8, wherein when said trimmer head assembly is rotated above predetermined rotational speed in said direction opposite said first direction relative to said trimmer housing, centrifugal force on said cam projection causes said spring to compressing allowing said cam projection to move radially outward past said second end of said second of said plurality of ramps allowing said cam projection to pass radially past said second of said plurality of ramps.

* * * * *